United States Patent [19]

Harris et al.

[11] 3,774,757

[45] Nov. 27, 1973

[54] PROTECTIVE ENVELOPE FOR PHONOGRAPH RECORD

[75] Inventors: Stewart G. Harris; Joseph B. Bazelmans, both of East Paterson, N.J.

[73] Assignee: Hers Management Corp., East Paterson, N.J.

[22] Filed: Sept. 29, 1971

[21] Appl. No.: 184,712

[52] U.S. Cl. ................ 206/62 P, 229/68 R, 317/2 R

[51] Int. Cl. .............................................. B65d 85/30

[58] Field of Search .................... 206/62 P, DIG. 34; 229/68 R; 317/2 R

[56] References Cited

UNITED STATES PATENTS

| | | | |
|---|---|---|---|
| 3,317,038 | 5/1967 | Bade et al. | 206/62 P |
| 3,422,952 | 1/1969 | George | 206/62 P |
| 3,532,932 | 10/1970 | Simon | 317/2 R |
| 2,540,981 | 2/1951 | Eisen | 206/DIG. 34 |
| 3,224,573 | 12/1965 | Way | 206/62 P |
| 3,668,658 | 6/1972 | Flores et al. | 206/62 P X |

*Primary Examiner*—Samuel B. Rothberg
*Assistant Examiner*—Steven E. Lipman
*Attorney*—Ryder et al.

[57] ABSTRACT

A protective envelope for phonograph records is disclosed which comprises a pair of electrostatically charged foamed synthetic polymer panels sealed together over less than their entire periphery and which protects the record and removes dust and dirt from the record as the record is removed therefrom.

4 Claims, 6 Drawing Figures

PATENTED NOV 27 1973 3,774,757

PROTECTIVE ENVELOPE FOR PHONOGRAPH RECORD

This invention relates to phonograph record covers and, more particularly, to protective envelopes for use separately or together with conventional phonograph record jackets and to a method for making such envelopes.

At the present time, record manufacturers package records in either paper or plastic envelopes which then are inserted into a paperboard record jacket for protection during storage. Records often fall from the record jackets if the jackets are not held properly. Also, the plastic envelopes frequently get folded accidentally and wind up in an unusable form in the back of the jacket. Neither the paper nor the plastic envelopes remove dust or dirt from the record requiring many phonograph users to wipe the records with a soft cloth before playing them.

Accordingly, it is one objective of this invention to provide a new and improved protective envelope for phonograph records, and a method for making the envelope, which removes dust and dirt particles from the record when the record is extracted from the envelope.

Another objective of this envelope is to provide a protective envelope for phonograph records which has improved record retention and protection characteristics.

It is a further objective of this invention to provide a protective envelope for phonograph records which may be easily and inexpensively manufactured and which may be used alone or in combination with a conventional phonograph record jacket.

Briefly stated, this invention in one form comprises a protective envelope for phonograph records formed from a pair of electrostatically charged panels made of foamed synthetic polymer such as polyurethane and joined together along three edges, the fourth edge forming an entrance to the envelope. The edges can be joined by heat sealing or other appropriate means. The panels are formed so that they have a higher level of static electricity than phonograph records.

An envelope made in accordance with this invention effectively cushions and protects the record to prevent scratching and, upon insertion and extraction of the record from the envelope, the dust and dirt on the record are attracted to and retained by the envelope.

This invention together with the above and other objectives and advantages will be readily apparent from the detailed description below taken together with the accompanying drawing in which.

Figure 1:
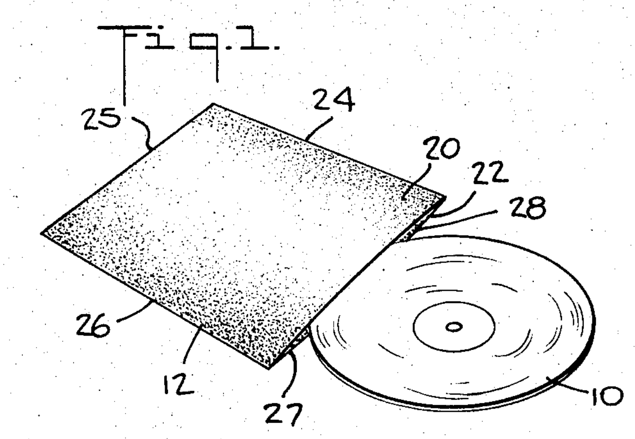
FIG. 1 is a perspective view illustrating the phonograph record protective envelope of this invention.
Figure 2:
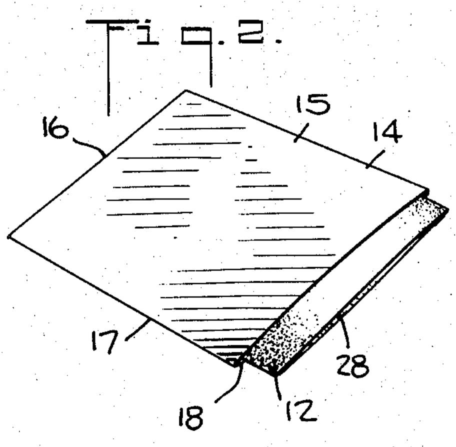
FIG. 2 is a perspective view of the envelope of FIG. 1 together with a conventional record jacket.
Figure 3:
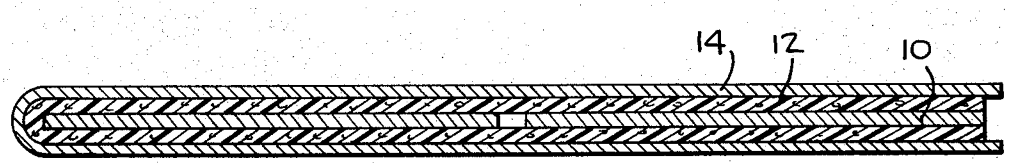
FIG. 3 is a sectional view showing the disposition of a phonograph record within the protective envelope of this invention placed within a record jacket.

With reference to FIGS. 1, 2 and 3, there is illustrated a phonograph record 10, a protective envelope 12 and a phonograph record jacket 14. The record jacket 14 is of conventional construction and is formed of paper board joined together along three edges 15, 16, and 17, leaving the fourth edge 18 open to receive the phonograph record and envelope 12.

The envelope 12 comprises two panels 20, 22 joined along three edges 24, 25, 26, the fourth edge 27 providing an entrance 28 into which the phonograph record 10 may be inserted. The envelope 12 is formed from a foamed synthetic polymer, such as a polyether or polyester polyurethane expanded foam sheet. The panels 20, 22, preferably prior to being formed into the envelope, are caused to have a static electrical charge higher than the charge normally induced in phonograph records. One way to charge the panels is to draw them, or a sheet from which they are formed, over a metallic surface in order to frictionally induce the charge. The sheet has a width equal to the desired size of the envelope and a length twice as long as the desired length of the envelope. The sheet is then folded in half so that the two panels 20, 22 lay contiguous to one another and form one of the edges 25. The two adjacent edges 24, 26 then are sealed together by any conventional means such as a heat sealing bar or wire which, when energized, fuses the foamed material along the two edges 24, 26 resulting in an envelope having three adjacent edges joined together.

Figure 5:
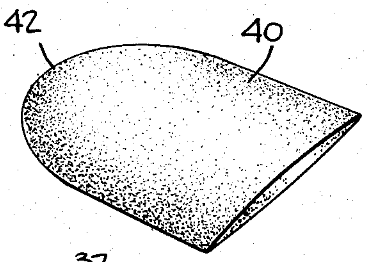
FIG. 5 is a perspective view of a phonograph record protective envelope formed in accordance with a second embodiment of this invention.
Figure 4:
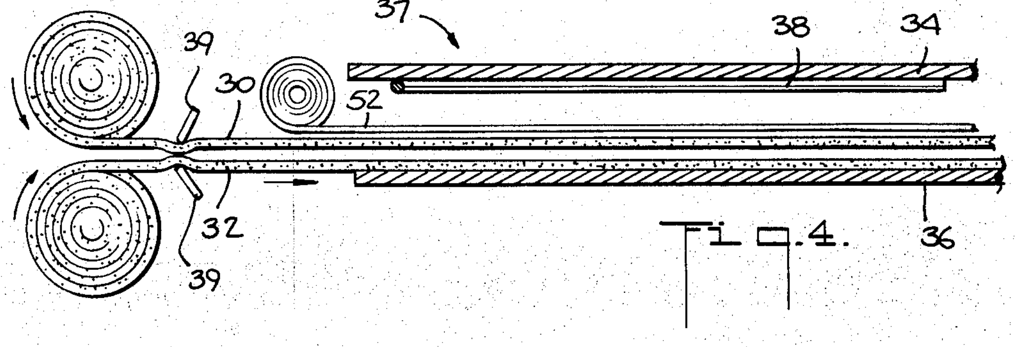
FIG. 4 is an elevational view of a heat sealing device used to form the phonograph record protective envelope of this invention.

Alternatively, as shown in FIG. 4, of the envelope 12 may be formed by continuously passing two sheets 30, 32 of the foamed polymer between an upper section 34 and lower section 36 of the heat sealing and cut-off device 37. One of the sections, such as the upper section 34, is provided with a heat sealing bar 38 contoured in the desired shape of the edges to be sealed. The upper section 34 is lowered onto the contiguous polymer sheets 30, 32 and, when energized, seals the edges of the envelope 12 and, at the same time, separates the formed envelope 12 from the remainder of the sheet material. In addition to permitting mass production of the envelopes at a minimal expense, this method also permits shaping the envelope. For example, the protective envelope 40 illustrated in FIG. 5 having a curved back edge 42 may be formed by this method.

An electrical charge inducing device also is illustrated and comprises a pair of metal plates 39 over which the foam sheets 30, 32 are drawn. Plates of other material might also be used provided their properties are such as to induce an electrostatic charge in the envelope as a result of frequent contact between the two.

Figure 6:
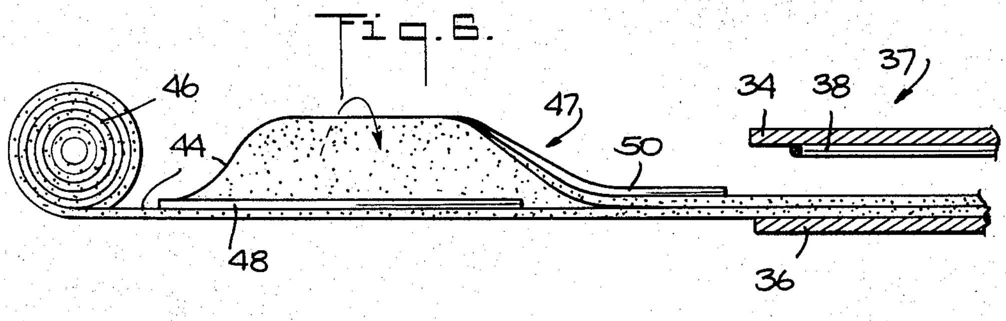
FIG. 6 is an elevational view of an alternative form of heat sealing device for forming phonograph record protective envelopes.

FIG. 6 schematically illustrates another method of continuously making the protective envelope 12. A single sheet 44 of synthetic polymer is fed from a roll 46 to conventional sheet folding equipment 47 such as is well known in the paper and paperboard industry. One type of such folding equipment includes a fold bar 48 about which the sheet is folded and a contoured fold plate 50 which effects the folding motion as the sheet is moved toward the heat sealing device 37. The sheet is folded in half and then sealed and cut as described above.

If desired, an exterior surface may be laminated, such as by thermal fusing, to the protective envelope to provide an attractively patterned three dimensional continuous skin or to provide a smooth exterior surface to one or both sides of the envelope which may subsequently be printed or otherwise decorated. The lamination may be performed independent of or in conjunction with the sealing process. For example, a laminate sheet 52 may be fed to a heat sealing device 37 together with the polymer sheet 30 and fused to the sheet by heating either or both the upper section plate 34 and lower section plate 36.

It can be seen that the phonograph record protective envelope formed in accordance with this invention has improved the protective characteristics and serves to remove dust and dirt particles from the record surface when the record is extracted for use. The charged envelope removes the dust and dirt by electrostatic attraction rather than merely a wiping action. While the envelope will retain its charge for a substantial period of time, the charge might dissipate if permitted to go unused. The envelope will be recharged by insertion and withdrawal of the record since the contact of the record against the interior surface of the envelope produces an electrostatic charge on the envelope. Because of the foamed interior of the envelope, there is less tendency for the record to roll accidentally out of the envelope. The envelope also may be used in conjunction with a phonograph record jacket or as an independent record storage and protective envelope and may be decorated attractively on the exterior surface thereof.

What is claimed is:

1. A protective envelope for phonograph records comprising a pair of adjacent electrostatically charged panels joined together along less than the entire periphery thereof, the unjoined portion being large enough to provide an entrance for receipt of a phonograph record, the panels being formed from foamed synthetic polymer, the panels having a higher level of static electricity than phonograph records in order to effect removal of dust and dirt particles electrostatically.

2. A protective envelope as defined in claim 1 wherein the panels are formed from expanded polyurethane.

3. A protective envelope as defined in claim 1 wherein the exterior surface of at least one panel is laminated to form a continuous exterior skin.

4. A protective envelope as defined in claim 3 wherein the skin is smooth and provides a surface adapted to be printed upon.

* * * * *